(12) United States Patent
Chen

(10) Patent No.: US 11,868,004 B2
(45) Date of Patent: Jan. 9, 2024

(54) BACKLIGHT MODULE FOR DISPLAY AND DISPLAY

(71) Applicant: Qisda Corporation, Taoyuan (TW)

(72) Inventor: Wan-Hui Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/691,187

(22) Filed: Mar. 10, 2022

(65) Prior Publication Data
US 2023/0185127 A1    Jun. 15, 2023

(30) Foreign Application Priority Data

Dec. 14, 2021   (TW) .................................. 110146723

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133614* (2021.01)

(58) Field of Classification Search
CPC ......... G02F 1/133603; G02F 1/133605; G02F 1/133614
See application file for complete search history.

(56) References Cited

U.S. PATENT DOCUMENTS

2020/0064690 A1    2/2020 Xu et al.

FOREIGN PATENT DOCUMENTS

| CN | 107329321 A | 11/2017 |
| CN | 207815079 U | * 9/2018 |
| TW | M563557 U | 7/2018 |

OTHER PUBLICATIONS

Office action of counterpart application by Taiwan IP Office dated Aug. 11, 2022.

* cited by examiner

*Primary Examiner* — Elmito Breval (57) ABSTRACT

A backlight module for a display is provided. The backlight module includes a base, a light emitting element, a reflector layer and a fluorescence material layer. The base includes a backplane and a sidewall, and the backplane connects to the sidewall to define a space. The light emitting element is on the backplane and in the space. The reflector layer is on the sidewall. The fluorescence material layer is on the reflector layer. The sidewall and the fluorescence material layer are on opposite sides of the reflector layer. The fluorescence material layer has a length less than a length of the reflector layer.

18 Claims, 5 Drawing Sheets

BACKLIGHT MODULE FOR DISPLAY AND DISPLAY

This application claims the benefit of Taiwan application Serial No. 110146723, filed Dec. 14, 2021, the subject matter of which is incorporated herein by reference.

BACKGROUND

Technical Field

The disclosure relates to a backlight module and a display, and more particularly to a backlight module for a display and a display including a backlight module.

Description of the Related Art

In order to meet consumers' demands for image quality and aesthetics of display, thin bezel design has become a trend in display industry. However, a bright edge issue around the display frequently occurs on a high image quality display with thin bezel design, which may make users' viewing experiences worse.

It is desirable to provide technology for a backlight module for a display with reduced bright edge issue.

SUMMARY

The present disclosure relates to a backlight module for a display and a display, which can improve the bright edge issue.

According to an embodiment of the present disclosure, a backlight module for a display is provided. The backlight module includes a base, a light emitting element, a reflector layer and a fluorescence material layer. The base includes a backplane and a sidewall. The backplane connects to the sidewall to define a space. The light emitting element is on the backplane of the base and in the space. The reflector layer is on the sidewall of the base. The fluorescence material layer is on the reflector layer. The sidewall of the base and the fluorescence material layer are on opposite sides of the reflector layer. The fluorescence material layer has a length less than a length of the reflector layer.

According to an embodiment of the present disclosure, a display is provided. The display includes a backlight module. The backlight module includes a base, a light emitting element, a reflector layer and a fluorescence material layer. The base includes a backplane and a sidewall. The backplane connects to the sidewall to define a space. The light emitting element is on the backplane of the base and in the space. The reflector layer is on the sidewall of the base. The fluorescence material layer is on the reflector layer. The sidewall of the base and the fluorescence material layer are on opposite sides of the reflector layer. The fluorescence material layer has a length less than a length of the reflector layer.

According to an embodiment of the present disclosure, a backlight module for a display is provided. The backlight module includes a base, a light emitting element, a reflector layer and a fluorescence material layer. The base includes a backplane and a sidewall. The backplane connects to the sidewall to define a space. The light emitting element is on the backplane of the base and in the space. The reflector layer is on the sidewall of the base. The fluorescence material layer is on the reflector layer. The reflector layer has an upper surface facing the fluorescence material layer, and the upper surface includes a plurality of protrusions.

The above and other embodiments of the disclosure will become better understood with regard to the following detailed description of the non-limiting embodiment(s). The following description is made with reference to the accompanying drawings.

DETAILED DESCRIPTION

Various embodiments will be described more fully hereinafter with reference to accompanying drawings, which are provided for illustrative and explaining purposes rather than a limiting purpose. For clarity, the components may not be drawn to scale. In addition, some components and/or reference numerals may be omitted from some drawings. It is contemplated that the elements and features of one embodiment can be beneficially incorporated in another embodiment without further recitation.

First Embodiment

Figure 1:
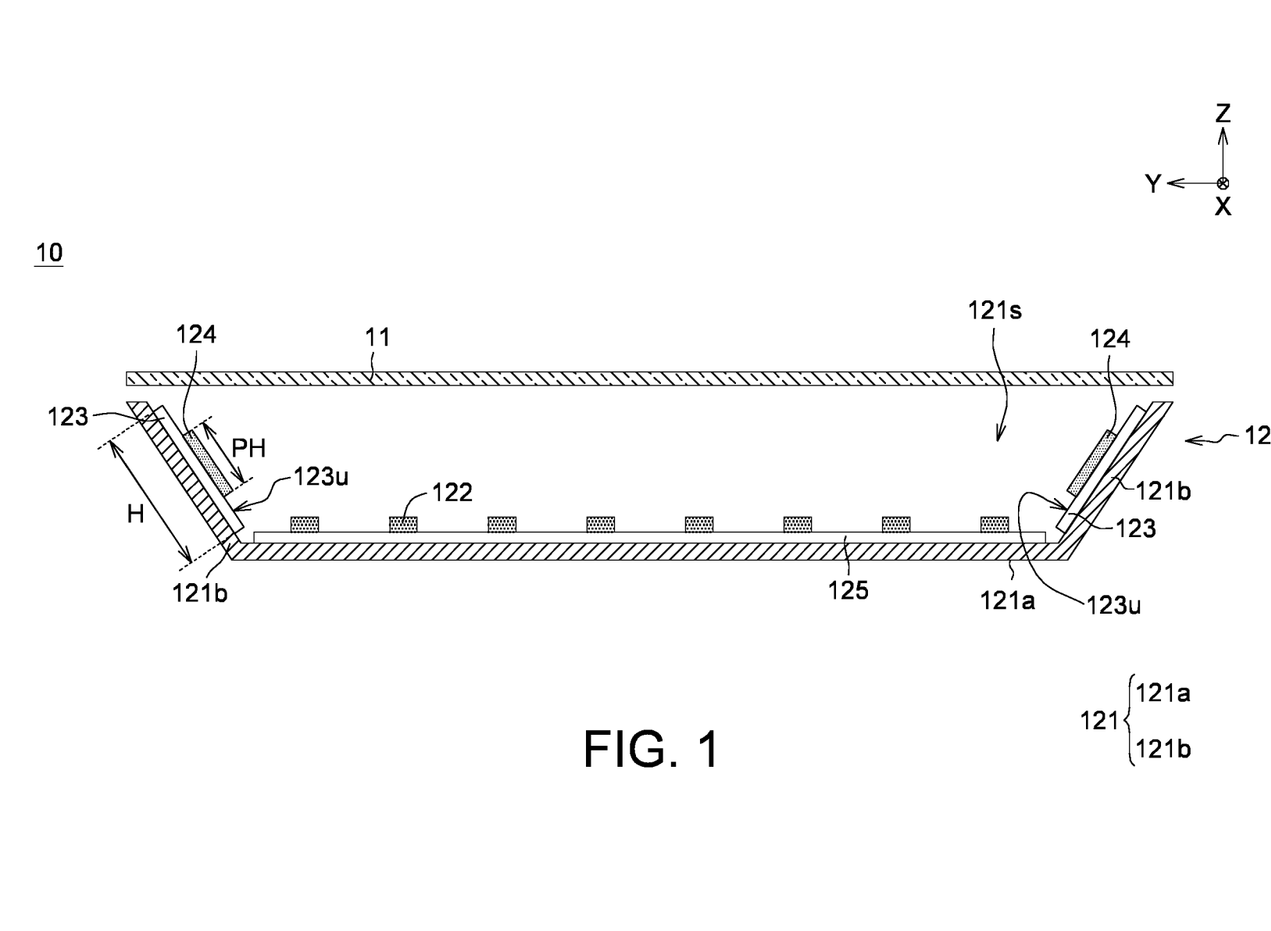
FIG. 1 is a cross-sectional view of a display according to the first embodiment of the present disclosure.

Referring to FIG. 1, FIG. 1 is a cross-sectional view of a display 10 according to the first embodiment of the present disclosure. The display 10 includes a display panel 11 and a backlight module 12. The display panel 11 is disposed on a light emitting side of the backlight module 12. In FIG. 1, the Z direction may be a direction perpendicular to a display surface of the display 10 for displaying an image, the X direction may be a direction parallel to a side of the display 10, and the Y direction may be a direction parallel to another side of the display 10. For example, the X direction may be parallel to one of the length and width of the display 10, the Y direction may be parallel to the other one of the length and width of the display 10. In an embodiment, the display panel 11 may be a liquid crystal display (LCD) for displaying an image. The backlight module 12 may be a direct backlight module or an edge backlight module. The backlight module 12 may be used as a light source when the display panel 11 displays an image.

The backlight module 12 includes a base 121, a light emitting element 122, a reflector layer 123 and a fluorescence material layer 124.

The base 121 includes a backplane 121a and a sidewall 121b. The backplane 121a connects to the sidewall 121b to define a space 121s. An internal angle of the backlight module 12 between the backplane 121a and the sidewall 121b may be a non-straight angle (i.e. the internal angle is not equal to 180 degrees). For example, as shown in FIG. 1, the internal angle of the backlight module 12 between the backplane 121a and the sidewall 121b may range from 90 to 180 degrees, and the sidewall 121b may extend outwardly with respect to the Z direction. The present disclosure is not limited thereto.

The light emitting element 122 is on the backplane 121a of the base 121 and in the space 121s. The light emitting element 122 may include light-emitting diodes (LEDs), micro light-emitting diodes (micro-LEDs) or mini light-emitting diodes (mini-LEDs). For example, the light emitting element 122 may be in the form of light bar. In an embodiment, the light emitting element 122 includes magenta light-emitting diodes.

The reflector layer 123 is on the sidewall 121b of the base 121 and in the space 121s. The reflector layer 123 has an upper surface 123u facing the space 121s. The reflector layer 123 can be used to reflect light emitted from the light emitting element 122. For example, the reflector layer 123 may be a white reflective film. The fluorescence material layer 124 is on the upper surface 123u of the reflector layer 123. The fluorescence material layer 124 is in the space 121s. The sidewall 121b of the base 121 and the fluorescence material layer 124 are on opposite sides of the reflector layer 123.

The fluorescence material layer 124 may include powdered phosphor, such as powdered YAG phosphor. The fluorescence material layer 124 may be formed via screen printing technology. In an embodiment, a screen above the reflector layer 123 may be spread with phosphor (such as by roller, spraying, impression, etc.), and then the phosphor may be transferred to the upper surface 123u of the reflector layer 123 through the apertures of the screen (e.g. by a squeegee blade) to form the fluorescence material layer 124 on the reflector layer 123. The concentration of the phosphor in the fluorescence material layer 124 may be about 20% to about 30%. In an embodiment, the fluorescence material layer 124 may include powdered green phosphor.

The backlight module 12 may further include a bottom reflector layer 125. The bottom reflector layer 125 is on the backplane 121a of the base 121 and between the light emitting element 122 and the backplane 121a. For example, the bottom reflector layer 125 may be a white reflective film.

Figure 2:
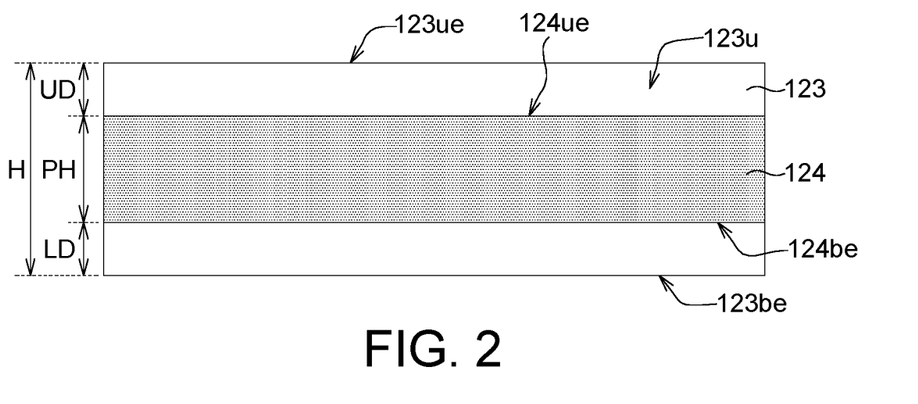
FIG. 2 is a top view of a reflector layer and a fluorescence material layer in FIG. 1.

Please refer to FIGS. 1-2 at the same time. FIG. 2 is a top view of a reflector layer 123 and a fluorescence material layer 124 in FIG. 1. The fluorescence material layer 124 may not completely cover the reflector layer 123. Specifically, the reflector layer 123 has a length H, and the length H may be equal to, for example, a length of a side of the reflector layer 123; the fluorescence material layer 124 has a length PH, and the length PH may be equal to, for example, a length of a side of the fluorescence material layer 124; the length PH of the fluorescence material layer 124 is less than the length H of the reflector layer 123.

In an embodiment, the length PH of the fluorescence material layer 124 may be less than or equal to one half ($1/2$) the length H of the reflector layer 123. In an embodiment, the length PH of the fluorescence material layer 124 may ranges from one-fourth ($1/4$) to one-third ($1/3$) the length H of the reflector layer 123. A distance LD between a lower edge 124be of the fluorescence material layer 124 and a lower edge 123be of the reflector layer 123 may range from one-third ($1/3$) to three-eighths ($3/8$) the length H of the reflector layer 123. A distance UD between an upper edge 124ue of the fluorescence material layer 124 and an upper edge 123ue of the reflector layer 123 may range from one-third ($1/3$) to three-eighths ($3/8$) the length H of the reflector layer 123.

In an embodiment, the fluorescence material layer 124 may be in a central area of the reflector layer 123. For example, the fluorescence material layer 124 may be in a central area of the length H of the reflector layer 123. For example, a central lateral axis of the fluorescence material layer 124 (e.g. a lateral axis perpendicular to a direction of the length PH and passing through a center of the fluorescence material layer 124) may overlap a central lateral axis of the reflector layer 123 (e.g. a lateral axis perpendicular to a direction of the length H and passing through a center of the reflector layer 123).

Figure 3:
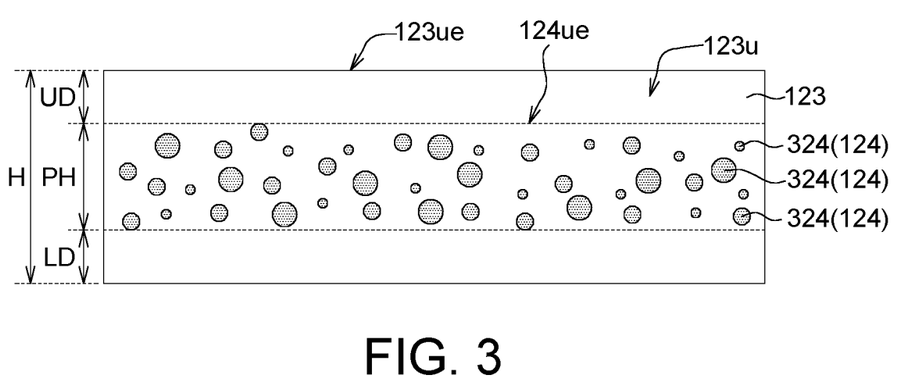
FIG. 3 is a top view of a reflector layer and a fluorescence material layer according to an embodiment of the present disclosure.

Referring to FIG. 3, FIG. 3 is a top view of a reflector layer 123 and a fluorescence material layer 124 according to an embodiment of the present disclosure. The fluorescence material layer 124 may include patterns 324 arranged apart on the reflector layer 123. For example, the patterns 324 may have circular shapes or other shapes. Each of the patterns 324 may have a pattern size ranging from 1 to 5 millimeters (mm). The definition of the pattern size may depend on the shapes of the patterns 324. In an embodiment, the pattern size can be defined as a diameter of a pattern 324 when the patterns 324 have circular shapes. In an embodiment, the pattern size can be defined as a length of a side of a pattern 324 when the patterns 324 have square shapes. In the embodiment shown in FIG. 3, the fluorescence material layer 124 includes patterns 324 with different sizes. The present disclosure is not limited thereto. The fluorescence material layer 124 may include patterns 324 with the same sizes. In an embodiment, a screen above the reflector layer 123 may be spread with phosphor, the phosphor may be transferred to the upper surface 123u of the reflector layer 123 through the apertures of the screen (e.g. by a squeegee blade) and distributed in the form of the patterns 324, and then the fluorescence material layer 124 is formed. The patterns 324 with circular shapes may be applied to a region of the display 10 where bright edge issue is slight.

Figure 4:
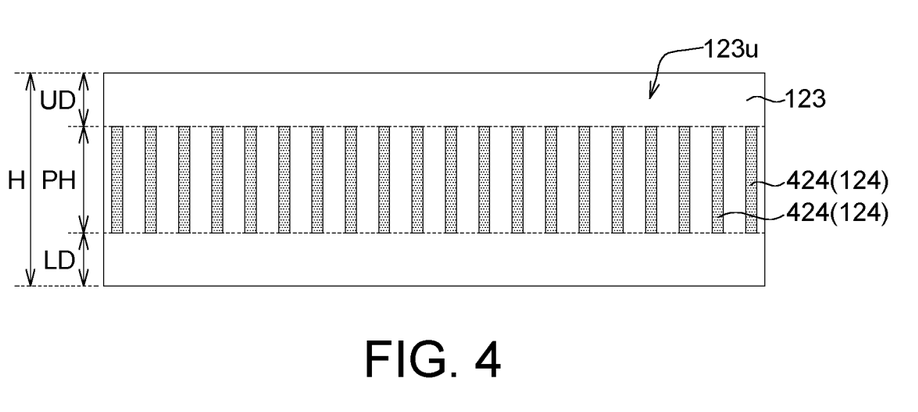
FIG. 4 is a top view of a reflector layer and a fluorescence material layer according to an embodiment of the present disclosure.

Referring to FIG. 4, FIG. 4 is a top view of a reflector layer 123 and a fluorescence material layer 124 according to another embodiment of the present disclosure. The fluorescence material layer 124 may include patterns 424 arranged apart on the reflector layer 123. The patterns 424 have linear shapes. In an embodiment, a screen above the reflector layer 123 may be spread with phosphor, the phosphor may be transferred to the upper surface 123u of the reflector layer 123 through the apertures of the screen (e.g. by a squeegee blade) and distributed in the form of the patterns 424, and then the fluorescence material layer 124 is formed. The patterns 424 with linear shapes may be applied to a region of the display 10 where bright edge issue is serious. In an embodiment, the fluorescence material layer 124 may include patterns 324 and patterns 424 at the same time.

Figure 5:
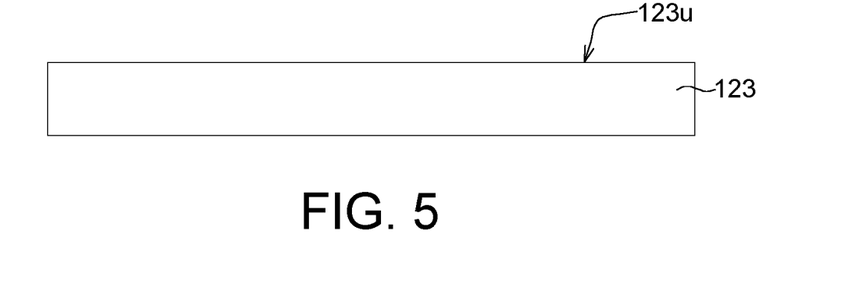
FIG. 5 is a cross-sectional view of a reflector layer according to an embodiment of the present disclosure.
Figure 6:
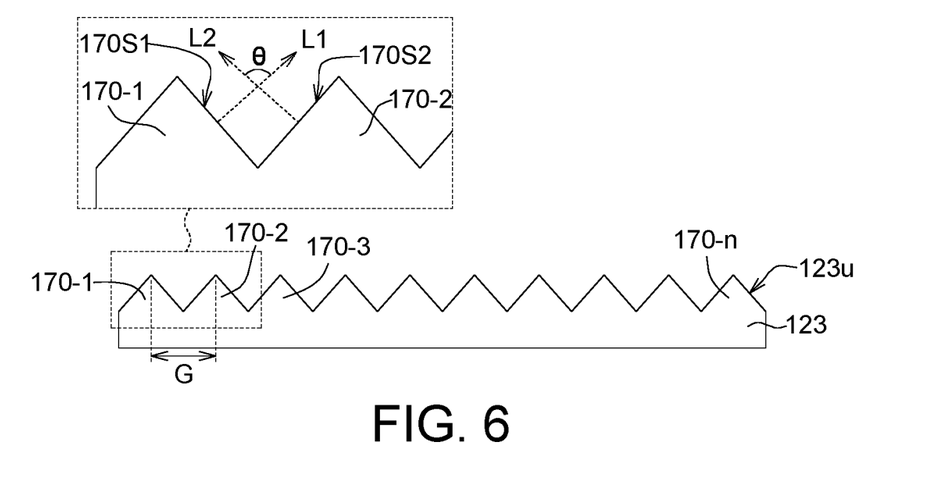
FIG. 6 is a cross-sectional view of a reflector layer according to an embodiment of the present disclosure.
Figure 7:
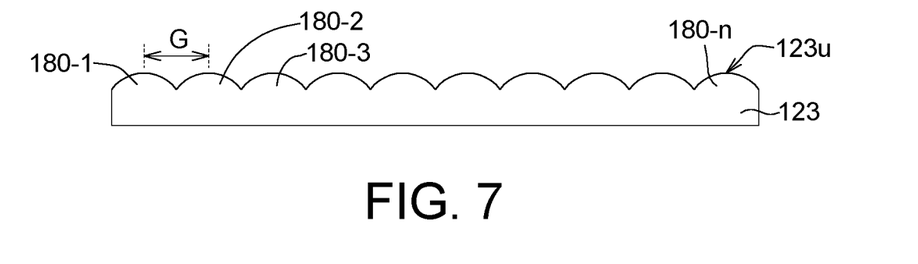
FIG. 7 is a cross-sectional view of a reflector layer according to an embodiment of the present disclosure.

Referring to FIGS. 5-7, FIGS. 5-7 are cross-sectional views of reflector layers 123 according to three embodiment of the present disclosure. In an embodiment, as shown in FIG. 5, the upper surface 123u of the reflector layer 123 is a flat surface.

In another embodiment, as shown in FIG. 6, the upper surface 123u of the reflector layer 123 may include microstructures arranged regularly or irregularly. For example, the upper surface 123u of the reflector layer 123 may include a plurality of protrusions 170-1, 170-2, 170-3 . . . 170-n, and n is a positive integer greater than 1. Specifically, the protrusion 170-1 (e.g. the first protrusion) is adjacent to the protrusion 170-2 (e.g. the second protrusion); the protrusion 170-1 has a first surface 170S1 with a first normal vector L1, and the protrusion 170-2 has a second surface 170S2 with a second normal vector L2; the first surface 170S1 of the protrusion 170-1 is adjacent to the second surface 170S2 of the protrusion 170-2, and there is an angle θ between the first normal vector L1 and the second normal vector L2. For example, the angle θ may be between 30 degrees and 60 degrees. A pitch G between the protrusion 170-1 and the protrusion 170-2 (i.e. between two adjacent protrusions) may be between 1 mm and 3 mm. The pitch G may be defined as a distance between a top point of the protrusion 170-1 and a top point of the protrusion 170-2. For example, the protrusions 170-1, 170-2, 170-3 . . . 170-n may have pyramid shapes or cone shapes.

In another embodiment, as shown in FIG. 7, the upper surface 123u of the reflector layer 123 may include microstructures arranged regularly or irregularly. For example, the upper surface 123u of the reflector layer 123 may include a plurality of protrusions 180-1, 180-2, 180-3 . . . 180-n, and n is a positive integer greater than 1. Specifically, the protrusion 180-1 (e.g. the first protrusion) is adjacent to the protrusion 180-2 (e.g. the second protrusion), a pitch G between the protrusion 180-1 and the protrusion 180-2 may be between 1 mm and 3 mm. The pitch G may be defined as a distance between a top point of the protrusion 180-1 and a top point of the protrusion 180-2. For example, the protrusions 180-1, 180-2, 180-3 . . . 180-n may have hemisphere shapes or hem i-ellipsoid shapes.

Second Embodiment

Figure 8:
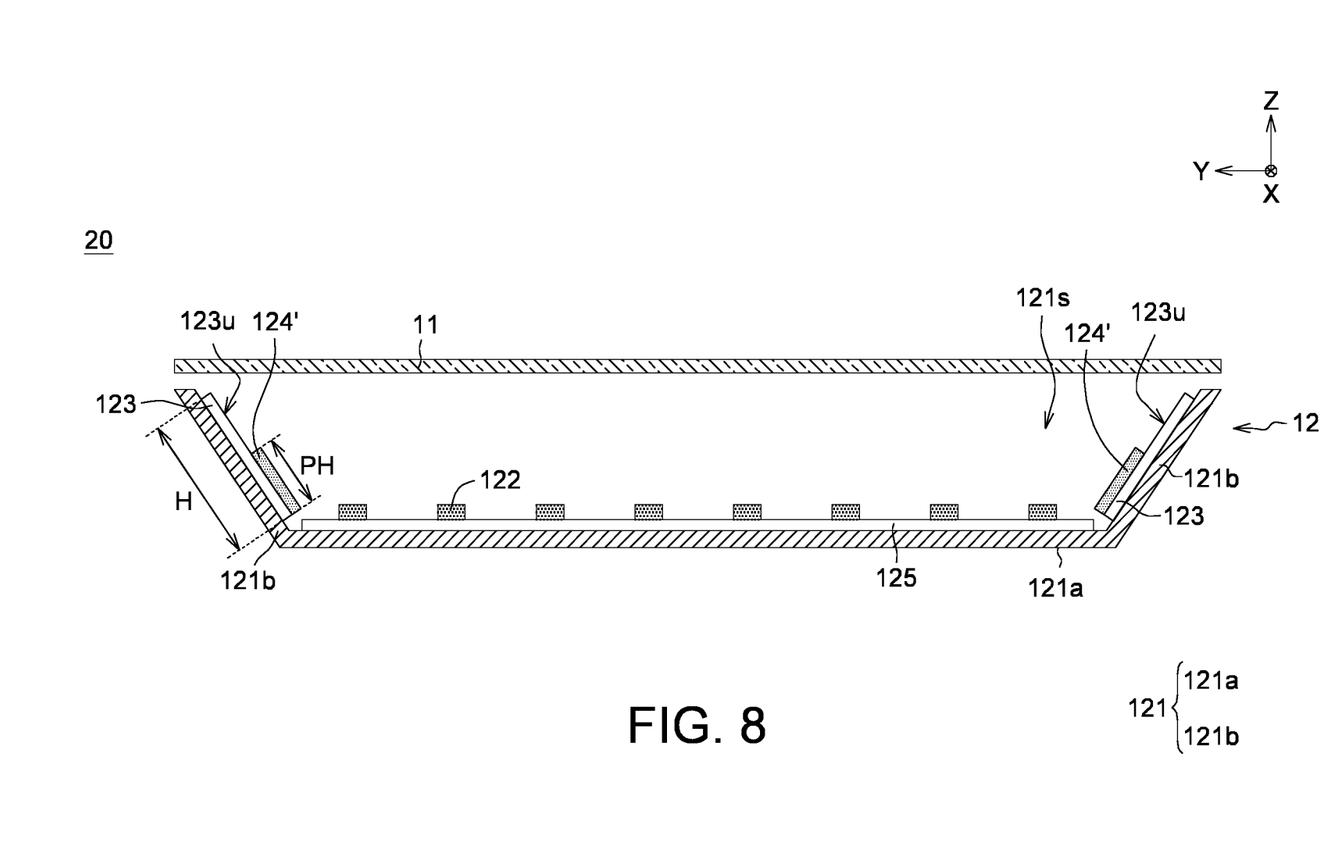
FIG. 8 is a cross-sectional view of a display according to the second embodiment of the present disclosure.
Figure 9:
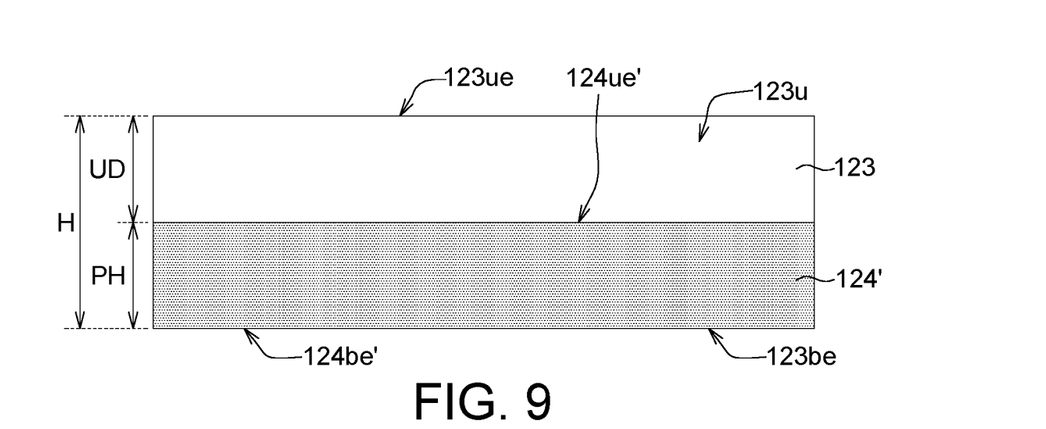
FIG. 9 is a top view of a reflector layer and a fluorescence material layer in FIG. 8.

Please refer to FIGS. 8-9 at the same time. FIG. 8 is a cross-sectional view of a display 20 according to the second embodiment of the present disclosure. FIG. 9 is a top view of a reflector layer 123 and a fluorescence material layer 124' in FIG. 8. The differences between the display 20 of the second embodiment and the display 10 of the first embodiment are that, the arrangement of the fluorescence material layer 124' relative to the reflector layer 123 in the second embodiment is different from the arrangement of the fluorescence material layer 124 relative to the reflector layer 123 in the first embodiment, and a size (e.g. a length) of the fluorescence material layer 124' in the second embodiment may be different from a size (e.g. a length) of the fluorescence material layer 124 in the first embodiment.

The fluorescence material layer 124' may be in the lower area of the reflector layer 123. For example, as compared with the fluorescence material layer 124 of the display 10, the fluorescence material layer 124' of the display 20 may be disposed closer to the backplane 121a.

The fluorescence material layer 124' may not completely cover the reflector layer 123. The reflector layer 123 has a length H, and the length H may be equal to, for example, a length of a side of the reflector layer 123; the fluorescence material layer 124' has a length PH, and the length PH may be equal to, for example, a length of a side of the fluorescence material layer 124'; the length PH of the fluorescence material layer 124' is less than the length H of the reflector layer 123. In an embodiment, the length PH of the fluorescence material layer 124' may be less than or equal to one half (½) the length H of the reflector layer 123. In an embodiment, the length PH of the fluorescence material layer 124' may ranges from one-third (⅓) to one half (½) the length H of the reflector layer 123. A distance UD between an upper edge 124ue' of the fluorescence material layer 124' and an upper edge 123ue of the reflector layer 123 may range from one half (½) to two-thirds (⅔) the length H of the reflector layer 123.

In this embodiment, a distance between a lower edge 124be' of the fluorescence material layer 124' and a lower edge 123be of the reflector layer 123 may be about 0. The lower edge 124be' of the fluorescence material layer 124' may overlap the lower edge 123be of the reflector layer 123.

Figure 10:
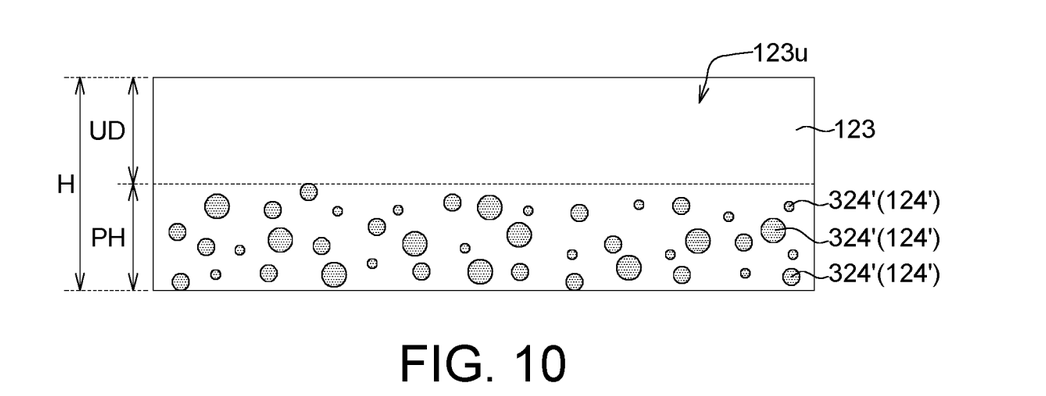
FIG. 10 is a top view of a reflector layer and a fluorescence material layer according to an embodiment of the present disclosure.

Referring to FIG. 10, FIG. 10 is a top view of a reflector layer 123 and a fluorescence material layers 124' according to an embodiment of the present disclosure. The fluorescence material layer 124' may include patterns 324' arranged apart on the reflector layer 123. For example, the patterns 324' may have circular shapes or other shapes. Each of the patterns 324' may have a pattern size ranging from 1 to 5 millimeters (mm). The definition of the pattern size may depend on the shapes of the patterns 324'. In an embodiment, the pattern size can be defined as a diameter of a pattern 324' when the patterns 324' have circular shapes. In an embodiment, the pattern size can be defined as a length of a side of a pattern 324' when the patterns 324' have square shapes. In the embodiment shown in FIG. 10, the fluorescence material layer 124' includes patterns 324' with different sizes. The present disclosure is not limited thereto. The fluorescence material layer 124' may include patterns 324' with the same sizes. The patterns 324' with circular shapes may be applied to a region of the display 20 where bright edge issue is slight.

Figure 11:
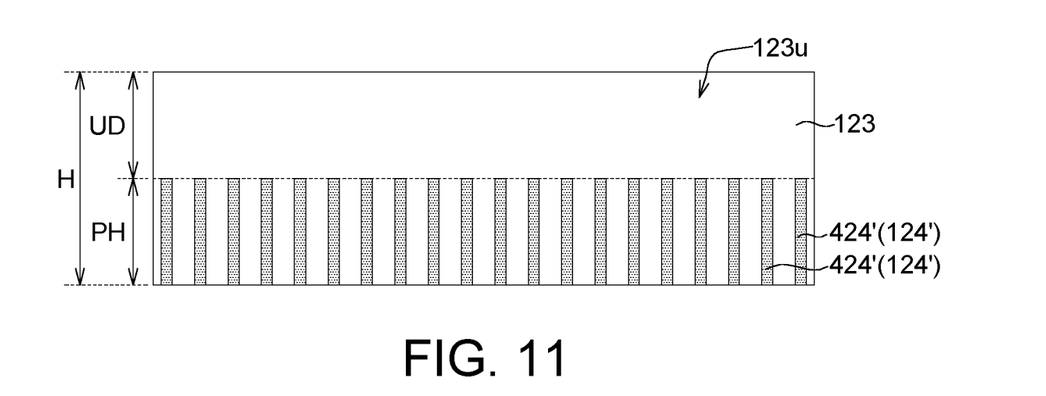
FIG. 11 is a top view of a reflector layer and a fluorescence material layer according to an embodiment of the present disclosure.

Referring to FIG. 11, FIG. 11 is a top view of a reflector layer 123 and a fluorescence material layers 124' according to another embodiment of the present disclosure. The fluorescence material layer 124' may include patterns 424' arranged apart on the reflector layer 123. The patterns 424' have linear shapes. The patterns 424' with linear shapes may be applied to a region of the display 20 where bright edge issue is serious. In an embodiment, the fluorescence material layer 124' may include patterns 324' and patterns 424' at the same time.

Generally, the arrangement of the fluorescence material layer 124/124' relative to the reflector layer 123 can be adjusted according to the position of the light emitting element 122, so that light emitted from the light emitting element 122 can pass through the fluorescence material layer 124/124' and lead the fluorescence material layer 124/124' to emit light. The combination of the light emitted from the light emitting element 122 and the light emitted from the fluorescence material layer 124/124' can improve the bright edge issue around the display 10/20. For example, in the case of the light emitting element 122 near the junction of the backplane 121a and the sidewall 121b of the base 121, the fluorescence material layer can be arranged as the arrangement shown in the second embodiment so as to make the light emitted from the light emitting element 122 pass through the fluorescence material layer. In an embodiment, when the light emitting element 122 is about 3 mm away from the junction of the backplane 121a and the sidewall 121b of the base 121 (or may be understood as an edge of the backplane 121a), the fluorescence material layer can be merely in a central area of the reflector layer, as the arrangement shown in FIGS. 2-4. In another embodiment, when the light emitting element 122 is about 1.5 mm away from the junction of the backplane 121a and the sidewall 121b of the base 121 (or may be understood as an edge of the backplane 121a), the fluorescence material layer can be near the backplane 121a, as the arrangement shown in FIGS. 9-11.

In an embodiment, when the light emitting element 122 includes magenta light-emitting diodes, the fluorescence material layer 124/124' may include powdered green phosphor. The magenta light from the light emitting element 122 pass through the fluorescence material layer 124/124' and lead the fluorescence material layer 124/124' to emit green light. The combination of the magenta light from the light emitting element 122 and the green light emitted from the fluorescence material layer 124/124' can effectively decrease the bright edge issue around the display, thereby enhancing users' viewing experiences. The above light emitting element may include light-emitting diodes with different colors as long as the color of the fluorescent material layer and the color of light emitted from the light emitting element can be combined to form white light. For example, blue light-emitting diodes may be used with yellow phosphor.

The present disclosure provides a display including a fluorescence material layer, and light emitted from the light emitting element can pass through the fluorescence material layer. With such configuration, the bright edge issue around the display can be improved, and color uniformity of the display can be increased as well. Moreover, the fluorescence material layer of the present disclosure has a length less than a length of the reflector layer (or the fluorescence material layer is not completely cover the reflector layer), which can increase luminous efficiency of the backlight module and reduce production cost.

It is noted that the structures as described above are provided for illustration. The disclosure is not limited to the configurations and procedures disclosed above. Other embodiments with different configurations of known elements can be applicable, and the exemplified structures could be adjusted and changed based on the actual needs of the practical applications. It is, of course, noted that the configurations of figures are depicted only for demonstration, not for limitation. Thus, it is known by people skilled in the art that the related elements and layers in a semiconductor structure, the shapes or positional relationship of the elements and the procedure details could be adjusted or changed according to the actual requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module for a display, comprising:
a base comprising a backplane and a sidewall, wherein the backplane connects to the sidewall to define a space;
a light emitting element on the backplane and in the space;
a reflector layer on the sidewall; and
a fluorescence material layer on the reflector layer, wherein the sidewall and the fluorescence material layer are on opposite sides of the reflector layer, the fluorescence material layer has a length less than a length of the reflector layer,
wherein a distance between the fluorescence material layer and an upper edge of the reflector layer ranges from one-third (⅓) to three-eighths (⅜) the length of the reflector layer.

2. The backlight module according to claim 1, wherein a distance between the fluorescence material layer and a lower edge of the reflector layer ranges from one-third (⅓) to three-eighths (⅜) the length of the reflector layer.

3. The backlight module according to claim 1, wherein the length of the fluorescence material layer is less than or equal to one half (½) the length of the reflector layer.

4. The backlight module according to claim 1, wherein a combination of a color of light emitted from the light emitting element and a color of the fluorescence material layer forms white light, the white light is produced by reflecting the light emitted from the light emitting element by the reflector layer.

5. The backlight module according to claim 4, wherein the light emitting element comprises magenta light-emitting diodes (LEDs), and the fluorescence material layer comprises powdered green phosphor.

6. The backlight module according to claim 1, wherein the fluorescence material layer comprises patterns, the patterns have circular shapes.

7. The backlight module according to claim 6, wherein each of the patterns has a diameter ranging from 1 to 5 millimeters (mm).

8. The backlight module according to claim 1, wherein the fluorescence material layer comprises patterns, the patterns have linear shapes.

9. The backlight module according to claim 1, wherein the reflector layer has an upper surface facing the space, the upper surface is a flat surface.

10. The backlight module according to claim 1, wherein the reflector layer has an upper surface facing the space, the upper surface comprises a plurality of protrusions.

11. The backlight module according to claim 10, wherein the plurality of protrusions comprises a first protrusion and a second protrusion adjacent to the first protrusion, the first protrusion has a first surface with a first normal vector, the second protrusion has a second surface with a second normal vector, the first surface of the first protrusion is adjacent to the second surface of the second protrusion, and there is an angle between the first normal vector and the second normal vector.

12. A display comprising a backlight module, the backlight module comprising:
a base comprising a backplane and a sidewall, wherein the backplane connects to the sidewall to define a space;
a light emitting element on the backplane and in the space;
a reflector layer on the sidewall; and
a fluorescence material layer on the reflector layer, wherein the sidewall and the fluorescence material layer are on opposite sides of the reflector layer, the fluorescence material layer has a length less than a length of the reflector layer,
wherein a distance between the fluorescence material layer and an upper edge of the reflector layer ranges from one-third (⅓) to three-eighths (⅜) the length of the reflector layer.

13. The display according to claim 12, wherein a distance between the fluorescence material layer and a lower edge of the reflector layer ranges from one-third (⅓) to three-eighths (⅜) the length of the reflector layer.

14. The display according to claim 12, wherein the fluorescence material layer comprises patterns, the patterns have circular shapes.

15. The display according to claim 12, wherein the length of the fluorescence material layer is less than or equal to one half (½) the length of the reflector layer.

16. A backlight module for a display, comprising:
- a base comprising a backplane and a sidewall, wherein the backplane connects to the sidewall to define a space;
- a light emitting element on the backplane and in the space;
- a reflector layer on the sidewall; and
- a fluorescence material layer on the reflector layer,
- wherein the reflector layer has an upper surface facing the fluorescence material layer, the upper surface comprises a plurality of protrusions,
- wherein a distance between the fluorescence material layer and an upper edge of the reflector layer ranges from one-third (⅓) to three-eighths (⅜) the length of the reflector layer.

17. The backlight module according to claim 16, wherein a distance between the fluorescence material layer and a lower edge of the reflector layer ranges from one-third (⅓) to three-eighths (⅜) of a length of the reflector layer.

18. The display according to claim 16, wherein the fluorescence material layer comprises patterns, the patterns have circular shapes.

* * * * *